US008731629B2

(12) United States Patent
King et al.

(10) Patent No.: US 8,731,629 B2
(45) Date of Patent: May 20, 2014

(54) INTERFACE DEVICE FOR A HIGH TEMPERATURE SUPERCONDUCTOR DEGAUSSING SYSTEM JUNCTION BOX

(75) Inventors: Christopher G. King, Worcester, MA (US); James F. Maguire, Andover, MA (US)

(73) Assignee: American Superconductor Corporation, Devens, MA (US)

( * ) Notice: Subject to any disclaimer, the term of this patent is extended or adjusted under 35 U.S.C. 154(b) by 1078 days.

(21) Appl. No.: 12/057,836

(22) Filed: Mar. 28, 2008

(65) Prior Publication Data
US 2009/0247411 A1 Oct. 1, 2009

(51) Int. Cl.
*H01L 39/24* (2006.01)
*B63G 9/06* (2006.01)
*H01F 6/06* (2006.01)
*H01F 13/00* (2006.01)

(52) U.S. Cl.
CPC *B63G 9/06* (2013.01); *H01F 6/065* (2013.01); *H01F 13/006* (2013.01); *Y10S 505/706* (2013.01); *Y10S 505/885* (2013.01); *Y10S 505/925* (2013.01); *Y10S 505/926* (2013.01)
USPC .......... 505/230; 505/220; 505/236; 505/706; 505/885; 505/925; 505/926

(58) Field of Classification Search
CPC .......... B63G 9/06; H01F 6/065; H01F 13/006
USPC .......... 505/220, 230, 236, 706, 885, 925, 926
See application file for complete search history.

(56) References Cited

U.S. PATENT DOCUMENTS

| 4,794,688 | A * | 1/1989 | Wada et al. ..................... 29/599 |
| 2005/0236175 | A1 * | 10/2005 | Reis ............................ 174/125.1 |
| 2008/0180202 | A1 | 7/2008 | Otto et al. |
| 2009/0247411 | A1 | 10/2009 | King et al. |

FOREIGN PATENT DOCUMENTS

| DE | 2205045 | 8/1973 |
| DE | 3905424 | 8/1990 |
| JP | 2003-123866 | 4/2003 |
| WO | 2008/011184 | 1/2008 |

OTHER PUBLICATIONS

Machine translation of JP 2003-123866.*

* cited by examiner

*Primary Examiner* — Paul Wartalowicz
(74) *Attorney, Agent, or Firm* — Occhiuti & Rohlicek LLP (57) ABSTRACT

A junction box is provided which allows serial connection of the individual conductors of at least one high temperature superconductor (HTS) wire bundle. The junction box includes an electrical interface device disposed within a junction box housing. The interface device is configured receive both ends of each conductor of each HTS wire bundle, and to provide a superconductive electrical connection between respective first ends of conductors to respective second ends of other wire bundle conductors to form at least one superconductive multi-turn electromagnetic winding.

16 Claims, 7 Drawing Sheets

INTERFACE DEVICE FOR A HIGH TEMPERATURE SUPERCONDUCTOR DEGAUSSING SYSTEM JUNCTION BOX

BACKGROUND OF THE INVENTION

1. Field of the Invention

The present invention relates to an electrical interface device for a degaussing system junction box.

2. Description of the Background Art

Lightweight conductors that can transmit large amounts of electric current without significant loss have numerous applications. For example, in electro-refining applications such as aluminum production processes, high amounts of current are required. Other applications requiring light-weight, high-current conductors are naval ships. Naval ships, typically formed of ferromagnetic materials and thus having a substantive magnetic field, are outfitted with complex degaussing systems which serve to reduce the magnetic field of the ship. This permits the naval ships to evade magnetic sensitive ordnances or devices such as mines that are triggered by the ship's large magnetic field.

In a degaussing system, a system of electromagnetic windings ("degaussing coils") are provided within the ships hull. For example, multi-turn wire windings are installed to surround the ship hull in each of three orthogonal directions. By controlling the electric current flowing through the degaussing coils, the magnetic field generated by the ship's hull can be controlled and even "canceled". This, in turn, reduces the possibility of detection of the ship by magnetic sensitive ordnance or devices.

To accommodate the high-current requirements in the exemplary applications described above, conventional wire cables, including degaussing coils, are formed of large diameter conductive wires, typically made of copper or aluminum wire. However, this leads to undesirably heavy, bulky, and inflexible cables.

Recently, it has been proposed to replace the large diameter conventional cables with conductors formed of high-temperature superconducting (HTS) materials. As used herein, a high temperature superconductor (HTS) material refers to a material that can maintain superconducting behavior at temperatures of 20 K and higher (i.e., critical temperature, $Tc \geq 20$ K). HTS wire bundles are disclosed in co-pending U.S. patent application Ser. No. 11/880,567, the contents of which are incorporated by reference herein. Accordingly, the HTS wire bundles afford greater flexibility, reduced weight, and high current carrying capacity, thereby having significant advantages over the conventional cables.

For both conventional cables and HTS wire bundles, in order to obtain a large wire winding using one or more multi-conductor cables/bundles, individual conductors within the multi-conductor cables or bundles must be serially joined. That is, an electromagnetic winding is formed from a multi-conductor cable or bundle by joining a first end of one conductor to the second end of another conductor, for each conductor until a single, multi-turn winding is obtained. For both conventional cables and HTS wire bundles, this is accomplished by manually soldering each connection, a process that is time consuming and highly labor intensive. Such soldering is prone to errors, including bad solder joints and improper connections, due to the difficulties associated with performing this work within the hull of a ship. Moreover, such errors are difficult to locate and repair.

SUMMARY

A junction box is provided which allows serial connection of the individual conductors of at least one high temperature superconductor (HTS) wire bundle. The junction box includes an electrical interface device disposed within a junction box housing. The interface device is configured receive both ends of each conductor of each HTS wire bundle, and to provide a superconductive electrical connection between respective first ends of conductors to respective second ends of other conductors to form at least one superconductive multi-turn electromagnetic winding.

In one aspect, a junction box is provided which includes a housing, one or more HTS wire bundles, each HTS wire bundle including multiple bundle conductors, each bundle conductor having opposed first and second bundle conductor ends, the first and second bundle conductor ends being received within the housing. An electrical interface device is disposed in the housing, the interface device configured to receive each end of each bundle conductors of each HTS wire bundle. The interface device is configured to electrically connect respective first ends of bundle conductors to respective second ends of other bundle conductors to form at least one multi-turn winding.

Embodiments of this aspect of the invention may include one or more of the following features: The interface device is configured to provide a superconductive electrical connection of the respective first ends of bundle conductors to the respective second ends of other bundle conductors to form at least one multi-turn superconducting winding. Each turn of the multi-turn winding comprises one bundle conductor. The housing defines a cryostat.

In addition, the interface device may include a substrate having interface conductors formed of a superconductive material disposed therein. The substrate is formed into a sheet having a first side, and a second side opposed to the first side, and the interface conductors extend within the substrate such that at least a portion of the connection lands corresponding to each end of each interface conductor are exposed on the first side of the substrate; and a layer of thermally conductive material provided on the second side of the substrate. In some embodiments, the current carrying capacity of an individual interface conductor is greater than the current carrying capacity of an individual bundle conductor. In some embodiments, the current carrying capacity of the interface conductors is about two times the current carrying capacity of the bundle conductors.

Further, in some embodiments, the substrate includes plural planar substrates disposed within the junction box in a parallel, spaced apart arrangement. In some embodiments, the substrate comprises plural planar substrates arranged substantially edge to edge within the junction box to form a polygon when viewed in section.

Still further, the wire bundles may include n conductors, and the interface device may include an input end, an output end, a substrate; and n+1 interface conductors embedded in the substrate such that at least n−1 interface conductors extend from the input end to the output end. In this embodiment, one of the input end and the output end of the interface device is connected to the first end of the wire bundle such that the $n_i$th interface conductor is joined to the $n_i$th wire bundle conductor, and the other of the input end and the output end of the interface device is connected to the second end of the wire bundle such that the $n_i$th interface conductor is joined to the $(n_i+1)$th wire bundle conductor. In addition, one end of the first interface conductor $(n_1)$ is configured to accept power input, and one end of the n+1$^{st}$ interface conductor is configured to provide power output. In some embodiments, a substrate is provided for each of the at least one wire bundles.

Still further, the interface device may include several substrates, and each substrate includes interface conductors formed of a superconductive material, the interface conductors disposed in the respective substrate.

In another aspect, an interface device may be provided which serially joins individual conductors of a multi-conductor superconductive wire bundle to form at least one multi-turn winding.

In yet another aspect, an interface device is provided which serially joins individual conductors of a wire bundle comprised of multiple HTS bundle conductors to form at least one multi-turn superconducting winding. The interface device may include an input end, an output end, a substrate, and multiple HTS interface conductors embedded in the substrate such that at least some of the interface conductors extend from the input end to the output end.

Embodiments of this aspect of the invention may include one or more of the following features: One of the input end and the output end of the interface device is connected to the first end of the wire bundle such that the nth interface conductor is joined to the nth bundle conductor, and the other of the input end and the output end of the interface device is connected to the second end of the wire bundle such that the nth interface conductor is joined to the (n+1)th bundle conductor.

In addition, the interface device is configured to provide an HTS electrical connection of the respective first ends of bundle conductors to the respective second ends of other bundle conductors to form at least one multi-turn superconducting winding. Each turn of the multi-turn winding includes one bundle conductor. The substrate is formed into a sheet having a first side, and a second side opposed to the first side, and the interface conductors extending within the substrate such that at least a portion of the connection lands corresponding to each end of each interface conductor are exposed on the first side of the substrate. A layer of thermally conductive material is provided on the a side of the substrate.

Further, in some embodiments, the current carrying capacity of an individual interface conductor is greater than the current carrying capacity of an individual bundle conductor. In some embodiments, the current carrying capacity of the interface conductors is about two times the current carrying capacity of the bundle conductors. In some embodiments, the interface device includes plural substrates.

Still further, a first end of one interface conductor is configured to connect to an input conductor of a power supply, and a second end of the one interface conductor corresponds to the input end of the interface device, and a first end of an other interface conductor is configured to connect to an output conductor of a power supply, and a second end of the other interface conductor corresponds to the output end of the interface device.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
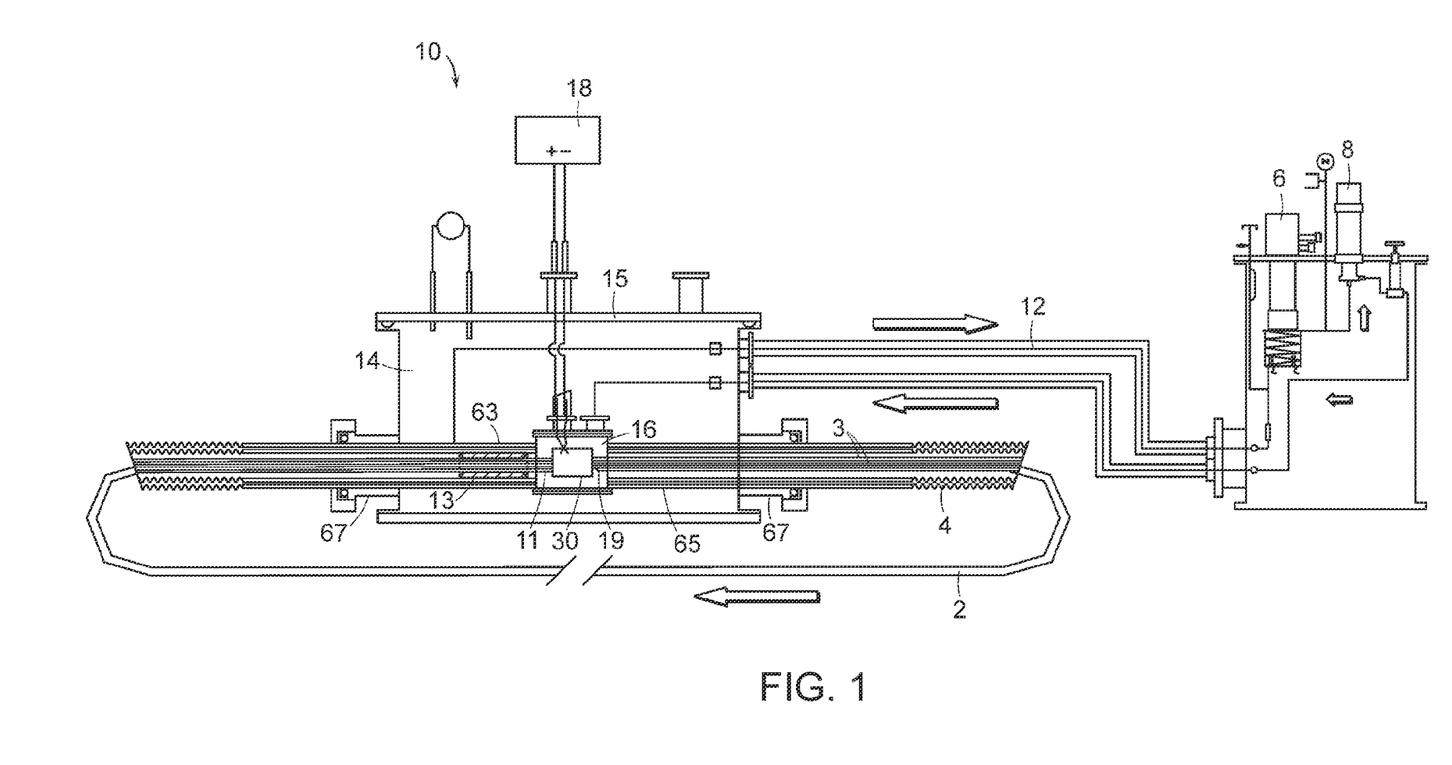
FIG. 1 is a schematic diagram of a degaussing system.

Referring to FIG. 1, a degaussing system 10 is provided, which includes one or more HTS wire bundles 2 enclosed in an elongate flexible bundle cryostat 4 (only a portion of the cryostat 4 is shown). The opposed ends of the HTS wire bundles 2 are received within a junction box 14, which serves to consolidate the various systems needed to achieve degaussing. A refrigeration unit 6 provides a suitable gas or liquid coolant 12 (e.g., cooled helium gas or liquid nitrogen) to an interior of a connection box 16 provided within the junction box 14, as well as to the bundle cryostat 4 via the connection box 16. A pump 8 circulates the coolant 12 from the refrigeration unit 6, through the connection box 16 and through the bundle cryostat 4 to maintain the individual HTS wire conductors 3 within the HTS wire bundles 2 at a temperature at which superconduction is possible. In addition, power is supplied from a power supply 18 to the HTS wire bundle 2 via the connection box 16.

In the degaussing system 10 as shown, the refrigeration unit 6 and the pump 8 are shown as housed separately from the junction box 14. However, the system 10 is not limited to this configuration. For example, in a more compact design, the refrigeration unit 6 and pump 8 may be integrated within junction box 14.

Figure 2:
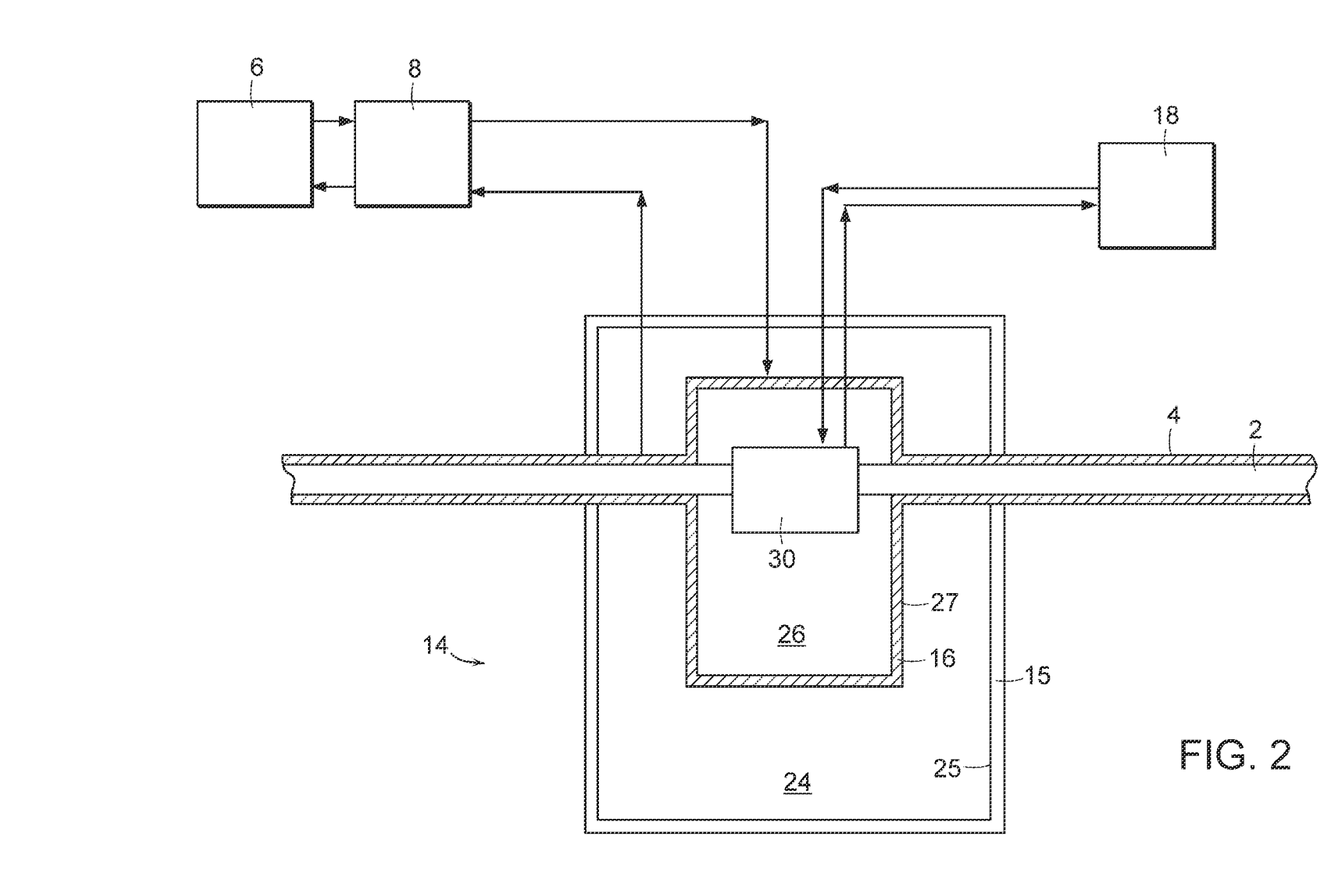
FIG. 2 is a schematic diagram of a junction box.

The junction box 14, shown schematically in FIG. 2, is a cryostat and includes an outer housing 15 and an inner housing corresponding to the connection box 16. The connection box (inner housing) 16 is substantially smaller in size than the outer housing 15 such that a relative large intermediate space 24 is provided between the outer housing 15 and the connection box 16. The intermediate space 24 is vacated so that a vacuum exists in the intermediate space 24. In addition, a layer of insulation (not shown) may be provided on an inner surface 25 of the outer housing 15, or on an outer surface 27 of the inner housing 16. A supply of coolant 12 is provided to the interior space 26 of the inner housing 16 by the refrigeration unit 6.

Referring again to FIG. 1, the junction box 14 is configured to receive opposed first 11 and second 19 ends of one or more HTS wire bundles 2 (only one wire bundle is shown). The HTS wire bundle 2 is formed of multiple HTS wires 3. In this particular embodiment, the HTS wire 3 is a "flat" wire, that is, the HTS wire 3 is formed to have a generally rectangular cross section in which the wire width is large relative to the wire depth, although the HTS wires 3 are not limited to this shape or proportion. The size of the cross-sectional area of the HTS flat wire 3 is related to the current carrying capacity of the wire such that an increase in the cross sectional area increases the current carrying capacity of the wire. The particular cross sectional area of the HTS wire 3 is determined by the specific requirements of the particular application. In addition, the particular type of HTS wire 3 employed is also determined by the specific requirements of the particular application. Examples of types of high temperature superconductors that may be employed in the HTS wire bundle 2 include, but are not limited to, copper oxide superconductors such as bismuth strontium calcium copper oxide (BSCCO), yttrium barium copper oxide (YBCO), and magnesium diboride ($MgB_2$).

In some embodiments, individual flat wires 3 may be provided with a coating 5 of a compliant material prior to stacking. The coating material 5 may be a conductor, a semiconductor, or an insulator. For example, the coating material 5 may be Kapton® (registered trademark of E. I. du Pont de Nemours and Company) polyimide film.

Figure 3:
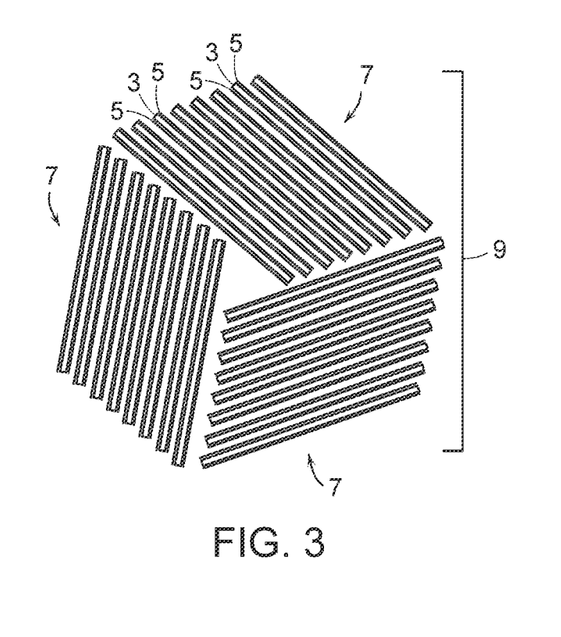
FIG. 3 is a cross sectional view of triad superstructure of HTS flat wires.

In some embodiments, several HTS flat wires 3 are arranged in a stacked configuration 7, although the inventive concept described herein is not limited to a stacked configuration. As seen in FIG. 3, individual HTS flat wires 3 may be stacked so that adjacent HTS flat wires 3 may be slightly offset in the width direction. In this case, the resulting stack 7 has a cross-sectional shape that is a parallelogram such as a rhomboid. The stack 7 is maintained in the desired configuration by any appropriate means, such as wrapping the stack 7 with polymer, paper, metal foil strip or the like (not shown).

In the illustrated embodiment, each stack 7 is formed of eight HTS flat wires 3. However, the inventive concept described herein is not limited to this number, and each stack 7 may be constituted by any number of HTS flat wires 3. In addition, several stacks 7 may be assembled together to form a stack superstructure 9. In the illustrated embodiment, three stacks 7 of HTS flat wires 3 are assembled to form a triad superstructure 9 having a substantially hexagonally-shaped cross-section. However, any number of stacks 7 may be assembled in any desired arrangement to form a stack superstructure 9. The number of stacks 7 employed and particular configuration of the stacks 7 is determined by the specific requirements of the particular application.

The stack superstructure 9 is maintained in the desired configuration by any appropriate means. In some embodiments, the stack superstructure 9 is maintained in the desired configuration by providing the stack superstructure 9 with an overwrap 21 formed of polymer tape or a preformed polymer helix such as a polytetraflouroethylene (TEFLON) wrap. As used herein, the term HTS wire bundle 2 refers to a stack superstructure 9 surrounded by a helical overwrap 21.

Each HTS wire bundle 2 is elongate, and may range in length from a few meters to hundreds of meters. Each HTS wire bundle 2 includes opposed first 11 and second 19 wire bundle ends. The first and second wire bundle ends 11, 19 are received within the junction box 14 such that each of the first and second wire bundle ends 11, 19 extend into the interior space 26 of the connection box 16.

Figure 4:
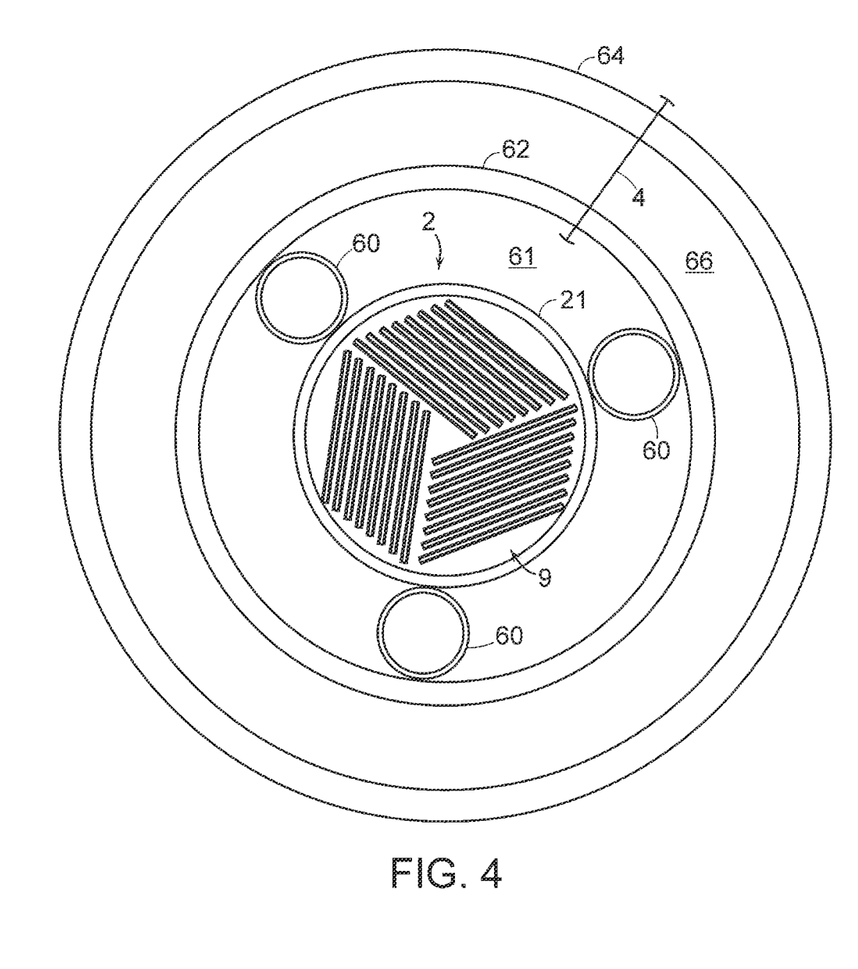
FIG. 4 is a cross sectional view of a HTS wire bundle within a bundle cryostat.

At locations exterior of the junction box 14, the HTS wire bundle 2 is disposed within the flexible bundle cryostat 4 (FIG. 4). The bundle cryostat 4 is an assembly of elongate, coaxially arranged stainless steel tubular housings 62, 64. The HTS wire bundle 2 is disposed within an interior space 61 of the inner housing 62, and is supported within the interior space 61 by one or more support members 60. An intermediate space 66 is provided between the inner housing 62 and the outer housing 64. The intermediate space 66 is vacated so that a vacuum exists in the intermediate space 66. The length of the bundle cryostat 4 generally corresponds to the length of the HTS wire bundle 2, and thus can be in the range of a few meters to hundreds of meters. The bundle cryostat 4 is joined to the junction box 14 so that the interior space 61 of the inner housing 62 opens to, and is in fluid communication with, the interior space 26 of the connection box 16. Fittings 67 are provided at respective opposed ends 63, 65 of the bundle cryostat 4 which permit the coolant 12 to be injected under pressure into the open interior space 61. The coolant 12, which flows between the respective opposed ends 63, 65 of the bundle cryostat 4, serves to maintain the HTS wires 3 at a temperature which permits the HTS wires 3, and thus the HTS wire bundle 2, to exhibit the property of superconductivity. In order to prevent the coolant 12 from bypassing between the inlet and outlet of the bundle cryostat 4, a flow restrictor 13 can be placed in the HTS wire bundle 2. In some embodiments, the fittings 67 are configured to fix the ends 63, 65 of the bundle cryostat 4 to the outer housing 15. In other embodiments (not shown) the fittings 67 may fix the ends 63, 65 of the bundle cryostat 4 to the connection box 16.

Figure 5:
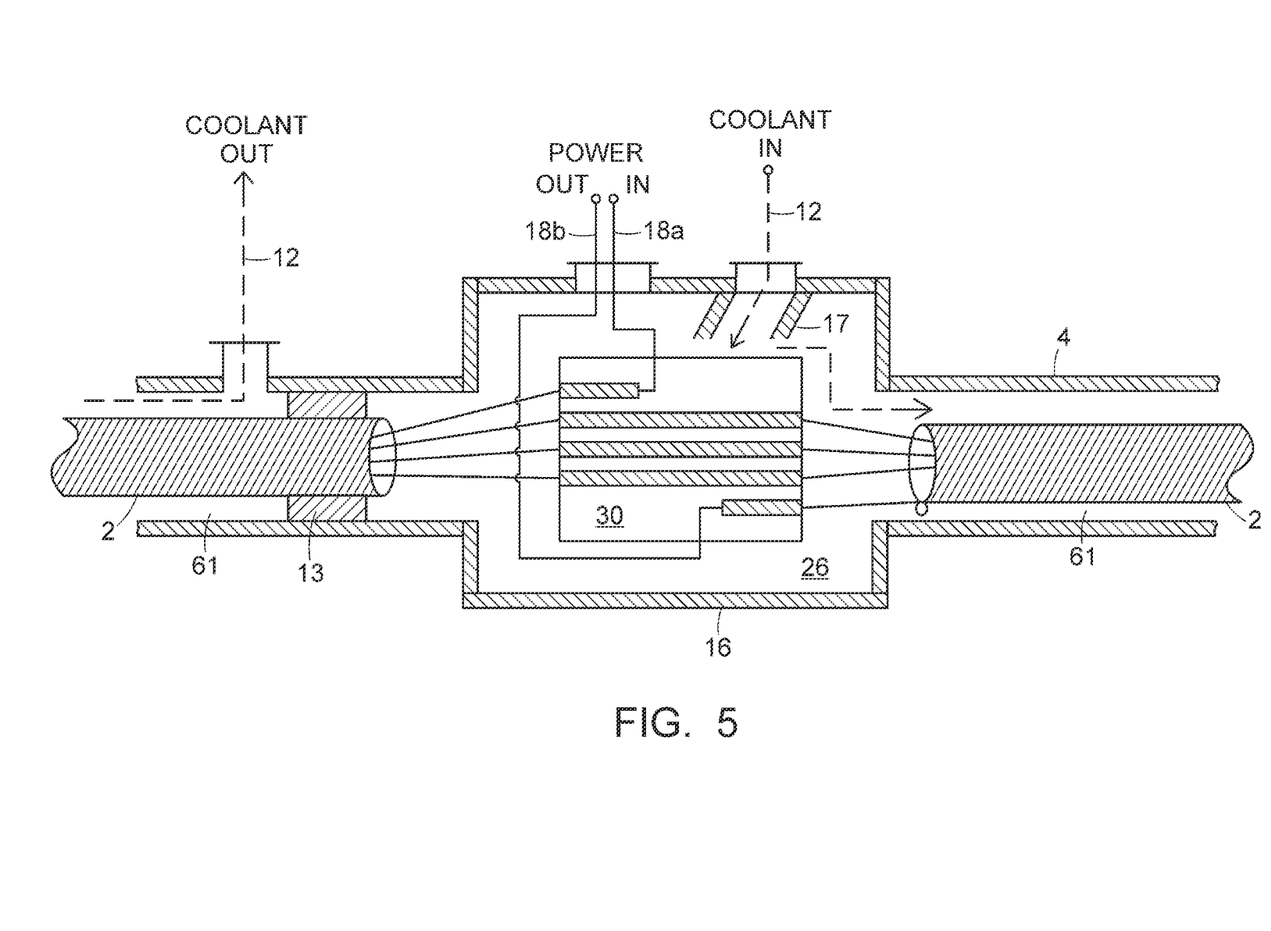
FIG. 5 is a schematic diagram of a connection box.

An electrical interface device 30 is disposed in the interior space 26 of the connection box 16 (FIG. 5). The interior space 26 receives coolant 12 from the refrigeration unit 6, and thus is maintained at a sufficiently low temperature to permit superconductivity therewithin. The interface device 30 is a single entity that is configured to received each end of each HTS wire 3 and superconductively connect the individual HTS wires 3 in series, whereby one or more lengths of multi-conductor HTS wire bundle 2 are converted into a single, multi-turn degaussing winding. In this arrangement, each turn of the multi-turn winding is constituted by one HTS wire 3.

Figure 6:
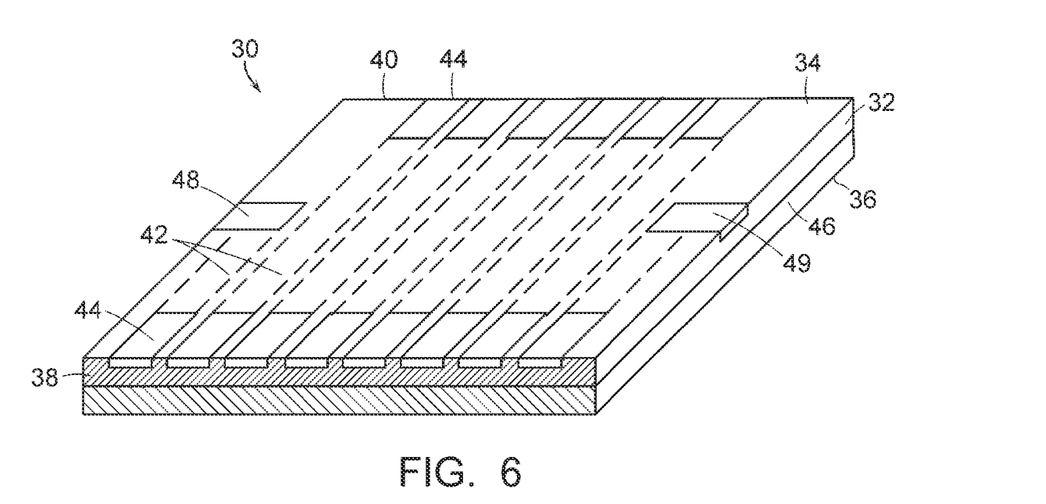
FIG. 6 is a perspective view of a substrate.

In some embodiments, the interface device includes a substrate 32 in which several interface conductors 42 are provided (FIG. 6). The substrate 32 may be formed of a conventional insulative material of the type used in printed circuit boards. For example, the substrate 32 may be formed of an epoxy resin, such as FR-4. The substrate is not limited to this material, and may be formed of other insulative material having properties which accommodate supporting electrical conductors in long term use at or below the critical temperature $T_c$ found within the interior space 26.

The substrate 32 has an upper surface 34, and an opposed lower surface 36. Herein, directional references such as "upper" and "lower" are used to provide a relational description with reference to an orientation shown in the figures, and are not intended to be absolute or limiting. A thermally-conductive layer 46 is formed on the lower surface 36, and serves to conduct heat away from interface conductors 42 disposed within the substrate 32. In some embodiments, the thermally conductive layer 46 is formed of copper.

Substrate 32 further includes power supply lands 48, 49 that permit connection of two of the interface conductors 42 within the interface device 30 to the power supply 18. As discussed further below, when the individual HTS wires 3 are connected to the respective interface conductors 42, power is supplied to the HTS wire bundle 2 from the power supply 18 via the power supply lands 48, 49. Power supply lands 48, 49 may receive power from power supply 18 via conventional copper wire conductors 18a, 18b, which may by connected to the lands 48, 49 by soldering or other conventional means. The power supply lands 48, 49, like the remaining interface conductors 42, are formed of superconductive materials, and thus the lands 48, 49 are configured to provide a long current transfer zone since current transfer must occur over a length that is proportional to the difference in cross-sectional area of the power supply conductor 18a, 18b and the HTS interface conductor 42.

In some embodiments, a single substrate 32 is disposed within the connection box 16. The substrate 32 may be formed to be plate-like in shape, as shown in FIG. 6. In other embodiments, the substrate may be formed to provide a curved surface. Such a curved surface may be C-shaped, circular, or spiral shaped when viewed in cross-section.

Figure 11:
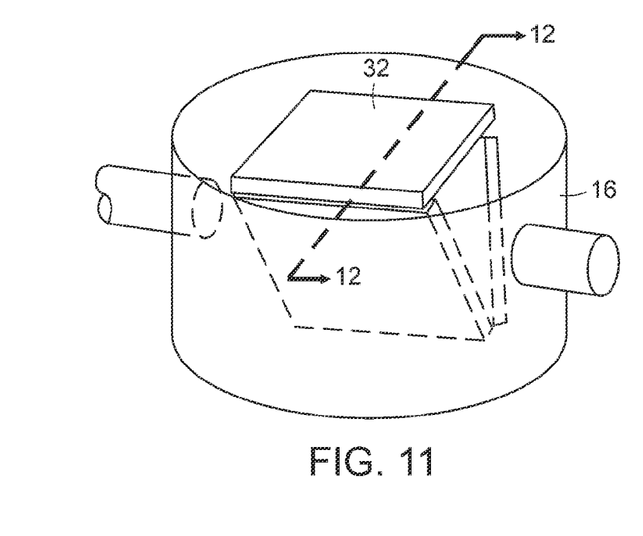
FIG. 11 is a perspective view of substrates disposed in the connection box.
Figure 12:
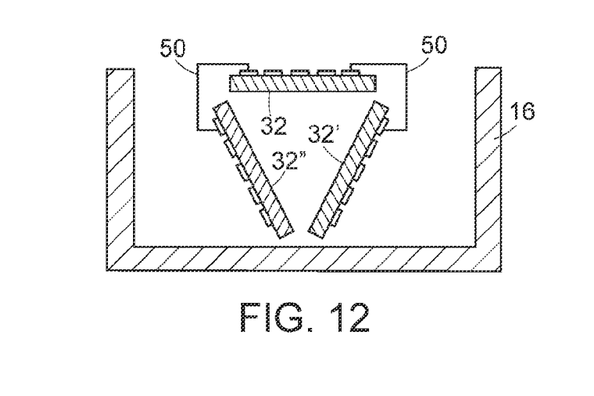
FIG. 12 is a sectional view along line 12-12 of FIG. 11.

In other embodiments, more than one substrate 32 is disposed within the connection box 16 (FIGS. 9-12), and the serial electrical connection between respective interface conductors 42, 42', 42" . . . of the different substrates 32, 32', 32" . . . is achieved using jumpers 50 that extend between the respective interface conductors 42, 42', 42" . . . (FIGS. 10, 12).

Figure 9:
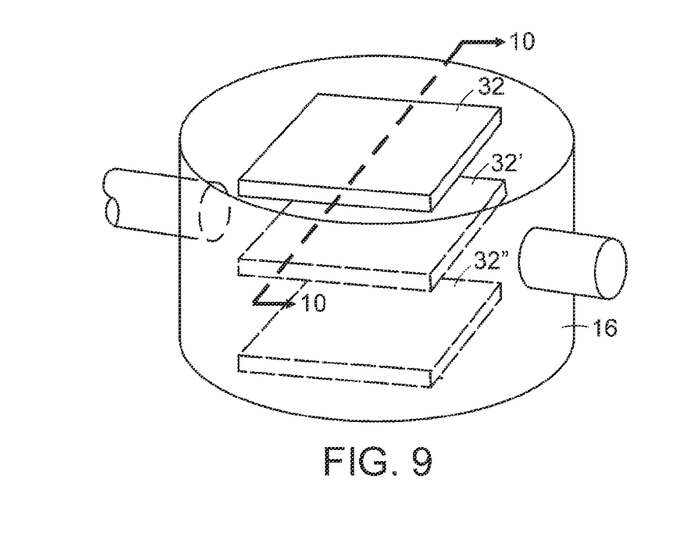
FIG. 9 is a perspective view of substrates disposed the connection box.
Figure 10:
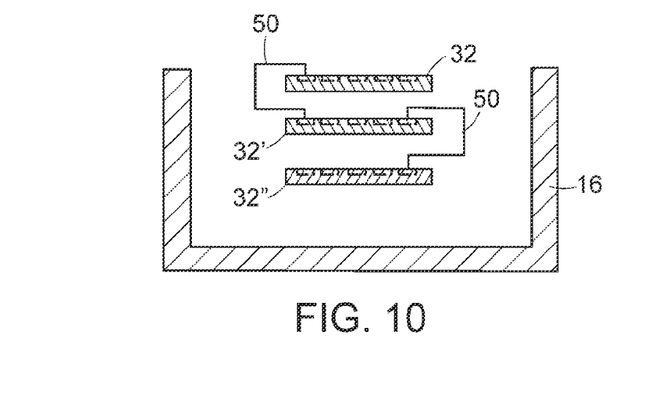
FIG. 10 is a sectional view along line 10-10 of FIG. 9.

In some embodiments, when more than one substrate 32 is employed, the substrate sheets 32, 32', 32" . . . are disposed within the connection box 16 in a parallel, spaced apart arrangement (FIG. 9, 10). In other embodiments, the substrate sheets 32 are arranged substantially edge to edge to form a polygon when viewed in section (FIG. 11, 12).

Interface conductors 42 are provided within the substrate 32, and are formed of superconductive material. The particular type of superconductive material employed to form the interface conductors 42 is determined by the specific requirements of the particular application. Examples of types of high temperature superconductors that may be used to form interface conductors 42 include, but are not limited to, copper oxide superconductors such as bismuth strontium calcium copper oxide (BSCCO), yttrium barium copper oxide (YBCO), and magnesium diboride ($MgB_2$). In some embodiments, the interface conductors 42 will be formed of the same superconductive material that is used to form the HTS wires 3.

As seen in FIG. 6, the interface conductors 42 are disposed in the substrate 32 so as to extend from a first end 38 to a second end 40 of the substrate 32. In some embodiments, the interface conductors 42 are deposited on the upper surface 34. In other embodiments, the interface conductors 42 are laminated within the substrate, and include elongate exposed connection lands (connection points) 44 corresponding to each end of each interface conductor 42.

The interface conductors 42 are arranged to extend in parallel within the substrate 32. Like the HTS flat wires 3, the interface conductors 42 are formed to have a generally rectangular cross section in which the interface conductor width $w_1$ is large relative to the conductor depth. The interface conductors 42 are oriented within the substrate 32 so that the conductor width is generally parallel to the upper surface 34 of the substrate 32.

Figure 7:
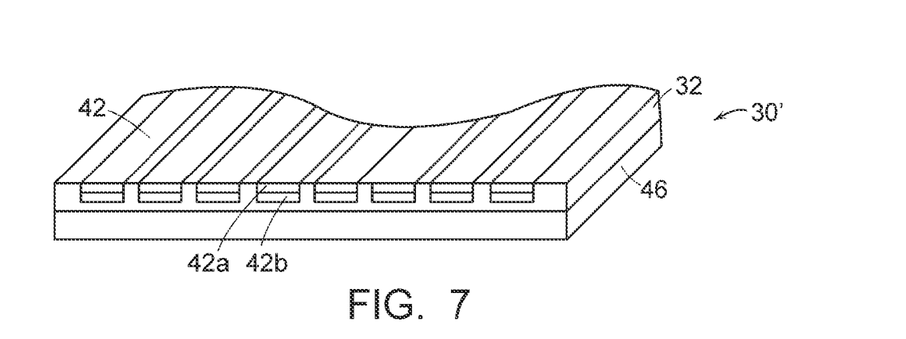
FIG. 7 is a partial perspective view of another embodiment of a substrate.
Figure 8:
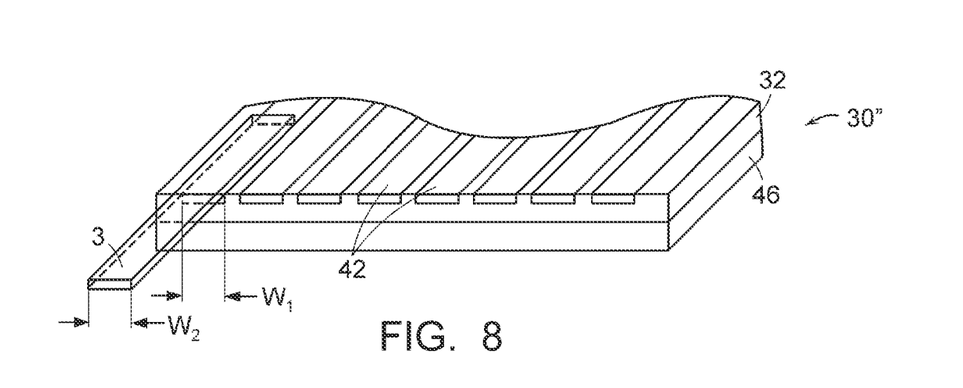
FIG. 8 is a partial perspective view of still another embodiment of a substrate.

In some embodiments, the interface conductor width $w_1$ is substantially the same as the width $w_2$ of the HTS wire 3. In other embodiments, in order to provide more current carrying capacity, the interface conductor 42 may be formed of two, vertically stacked interface conductors 42a, 42b (FIG. 7). By this arrangement, the current carrying capacity of the interface conductor is greater than that of the HTS wire 3. For example, by stacking two interface conductors 42a, 42b, the current carrying capacity of the interface conductor 42 is about twice the current carrying capacity of the HTS wire 3. Alternatively, an arrangement in which the interface conductor 42 is provided in a width $w_1$ that is much greater than, for example two times the width $w_2$ of the HTS wire 3, may be employed to achieve increased current carrying capacity (FIG. 8).

Moreover, the interface conductors 42 are arranged within the substrate 32 in a way that joins respective ends 11, 19 of the HTS wire bundle 2 such that the individual HTS wires 3 are serially connected. An exemplary arrangement of interface conductors 42, including power supply lands 48, 49, is shown schematically in FIG. 13, in which the interface conductors 42 are numbered from C1 to C13.

Figure 13:
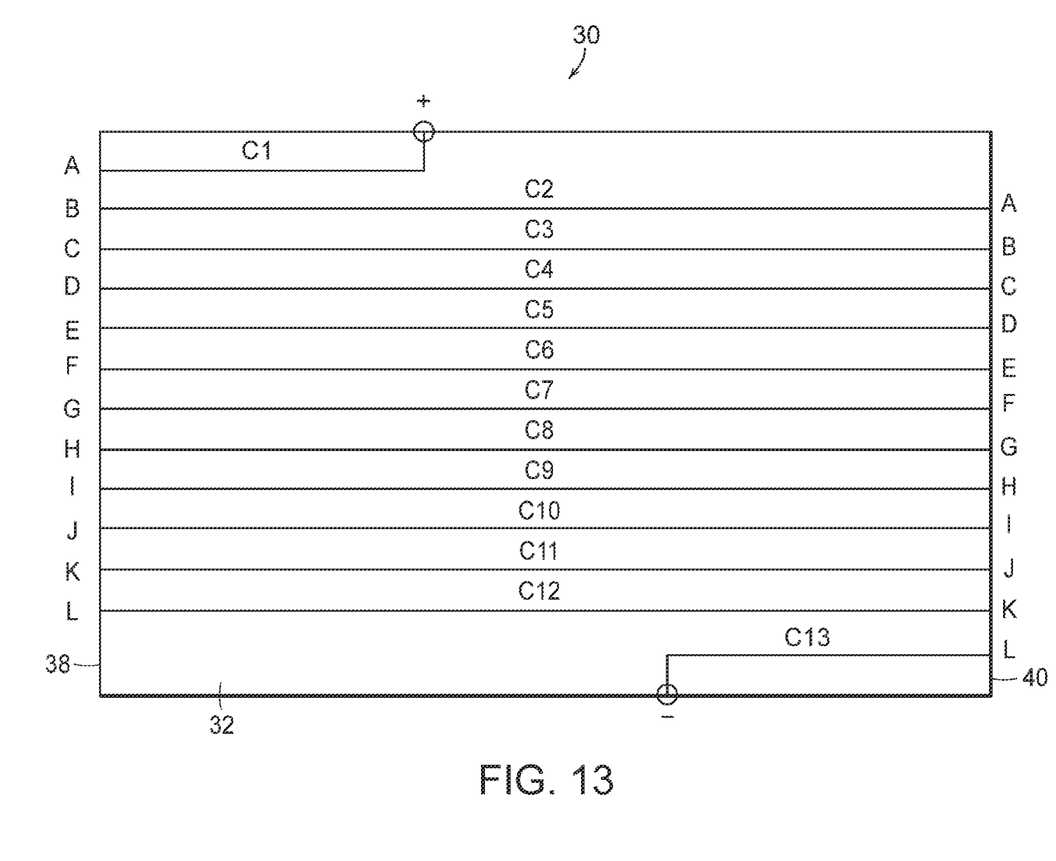
FIG. 13 is a schematic of the interface conductor configuration within the substrate.

The HTS wires 3 of one or more HTS wire bundles 2 may be received by the interface device 30. In this example, respective opposed ends of each HTS wire 3 are represented alphabetically, whereby both ends of a first HTS wire 3 are labeled "A", both ends of another HTS wire 3 are labeled "B", et cetera, until each HTS wire 3 is uniquely represented. In this example, one or more HTS wire bundles 2 provide twelve HTS wires 3, represented as A, B, C, D, E, F, G, H, I, J, K, and L.

In the illustrated example of FIG. 13, a first end of the HTS wire A is connected to interface conductor C1 at the first end 38 of the substrate 32. In this case, interface conductor C1 corresponds to a power supply land 48, for example corresponding to a positive pole of the power supply 18. Similarly, a first end of the HTS wire B is connected to interface conductor C2 at the first end 38 of the substrate 32, a first end of the HTS wire C is connected to interface conductor C3 at the first end 38 of the substrate 32, and so forth.

Also in the illustrated example, a second end of the HTS wire A is connected to interface conductor C2 at the second end 40 of the substrate 32. Thus, the connection location of the second end of the HTS wire 3 is offset by one interface conductor 42 relative to the connection location of its first end. Similarly, a second end of the HTS wire B is connected to interface conductor C3 at the second end 40 of the substrate 32, a second end of the HTS wire C is connected to interface conductor C4 at the second end 40 of the substrate 32 and so forth, continuing in this manner until the last HTS wire L is connected to interface conductor C13. In this case, interface conductor C13 corresponds to a power supply land 49, for example corresponding to a negative pole of the power supply 18. By this arrangement, the interface device 30 is configured to receive opposed first and second ends 11, 19 of the HTS wire bundle 2, and to connect HTS wires 3 from the first end 11 to respective HTS wires 3 of the second end 19 to form at least one superconductive multi-turn winding.

In the illustrated example of FIG. 13, one or more HTS wire bundles 2 provide twelve HTS wires 3, and the interface device 30 has thirteen interface conductors 42. It is understood that the interface device 30 is not limited in the number of HTS wires that can be received. In particular, the interface device 30 is not limited to having thirteen interface conductors 42, but may be provided with greater or fewer numbers of interface conductors 42 as required by the specific application. For example, it is well within the art to provide one or more substrates 32 having interface conductors 42 as needed to accommodate the number of HTS wires 3 employed in a particular application.

For a junction box 14 configuration in which one or more HTS wire bundles 2 are connected to a single substrate 32, and the HTS wire bundles 2 comprise n HTS wires, then in order to form an electromagnetic winding employing all n of the HTS wires 3 of the HTS wire bundle 2, the interface device 30 must be provided with at least n+1 interface conductors 42 embedded in the substrate 32 such that at least n−1 interface conductors extend from the first end 38 to the second end 40. The first end 38 of the interface device 30 is connected to the first end 11 of the HTS wire bundle 2 such that the $n_i$th interface conductor is joined to the $n_i$th wire bundle conductor, and the second end of the interface device 40 is connected to the second end 19 of the HTS wire bundle 2 such that the $n_i$th interface conductor is joined to the $(n_i+1)$th wire bundle conductor. In this configuration, one end of the first interface conductor ($n_1$) is configured to accept power input, and one end of the $(n+1)^{st}$ interface conductor is configured to provide power output.

In the illustrated example of FIG. 13, the first end of the nth HTS wire 3 is connected to a first end of the nth interface conductor, and the second end of the nth HTS wire 3 is connected to the second end of the (n+1)th interface conductor. However, the interface device 30 is not limited to this particular sequence of connections. One of ordinary skill in the art is capable of determining other sequences of connections in which a multi-turn winding is obtained, and in which the first and second ends of an HTS wire 3 are not connected to opposed ends of the same interface conductor 42.

As described above, coolant 12 is directed into the connection box 16 to maintain the interface device 30 and the HTS wires 3 within the bundle cryostat 4 at a temperature which permits the HTS wires 3 and the interface conductors 42 to exhibit the property of superconductivity. In some embodiments, the connection box 16 may be configured to focus the flow of coolant 12 directly at the interface device 30. This can be achieved by providing an appropriate structure such as a nozzle (not shown) or deflector 17 (FIG. 5) at the inlet of the coolant 12 to the connection box 16, or at a location intermediate the inlet and the interface device 30.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed, is:

1. An apparatus for forming a multi-turn winding by joining individual high-temperature-superconductor bundle conductors in series, said apparatus comprising a junction box, said junction box comprising a high-temperature-superconductor wire bundle having a first bundle conductor and a second bundle conductor, said first bundle conductor having a first end and a second end, said first and second ends separated from each other by a first path length that corresponds to a length of said first bundle conductor, said second bundle conductor having a first end and a second end, said first and second ends being separated from each other by a second path length that corresponds to a length of said second bundle conductor, a housing having a first side and a second side, said first side receiving said first end of said first bundle conductor and said first end of said second bundle conductor, and said second side receiving said second end of said first bundle conductor and said second end of said second bundle conductor, and an electrical interface device disposed in said housing, said electrical interface device having a first electrical-interface-device end, a second electrical-interface-device end, a substrate, a first superconducting interface conductor extending across said substrate between said first electrical-interface-device end and said second electrical-interface-device end, and a second superconducting interface conductor extending across said substrate between said first electrical-interface-device end and said second electrical-interface-device end, a third superconducting interface conductor extending across said substrate between said first electrical-interface-device end and said second electrical-interface-device end, wherein said first superconducting interface conductor is separate and distinct from said first bundle conductor, wherein said first superconducting interface conductor is separate and distinct from said second bundle conductor, wherein said second superconducting interface conductor is separate and distinct from said first bundle conductor and wherein said second superconducting interface conductor is separate and distinct from said second bundle conductor, wherein said third superconducting interface device is separate and distinct from said second bundle conductor, wherein said first end of said first bundle conductor is connected to said first superconducting interface conductor, wherein said second end of said first bundle conductor is connected to said second superconducting interface conductor, thereby defining a first turn of said multi-turn winding, and wherein said first end of said second bundle conductor is connected to said second superconducting interface conductor and said second end of said second bundle conductor is connected to said third superconducting interface conductor, thereby defining a second turn of said multi-turn winding, and thereby causing a series connection between said first turn and said second turn of said multi-turn winding, said series connection resulting in said multi-turn winding having a path length that is at least a sum of said first path length and said second path length.

2. The apparatus of claim 1, wherein said housing defines a cryostat.

3. The apparatus of claim 2, wherein said cryostat is configured to provide sufficient cooling to permit said superconducting interface conductors to maintain superconductivity.

4. The apparatus of claim 1, wherein said substrate comprises a sheet having a first side, and a second side opposed to said first side, and a layer of thermally conductive material provided on said second side of said sheet, and wherein said first and second superconducting interface conductors extend within said substrate such that a connection land corresponding to each end of each superconducting interface conductor is exposed on said first side of said sheet.

5. The apparatus of claim 4, wherein a current carrying capacity of said first superconducting interface conductor exceeds a current carrying capacity of said first bundle conductor.

6. The apparatus of claim 5, wherein said current carrying capacity of said first superconducting interface conductor is at least double said current carrying capacity of said first bundle conductor.

7. The apparatus of claim 1, wherein said electrical interface device comprises a plurality of planar substrates, each planar substrate extending along a plane associated with said planar substrate, said planes defining a prism.

8. The apparatus of claim 7, wherein said prism has a triangular base.

9. The apparatus of claim 1, wherein said high-temperature-superconductor wire bundle comprises high-temperature-superconductor bundle conductors numbered $n_1$, $n_2$, $n_3$, ... $n_i$, $n_{i+1}$, ... $n_N$, and wherein said electrical interface device comprises (N+1) superconducting interface conductors embedded in said substrate, wherein at least (N−1) of said (N+1) interface conductors extend between said first electrical-interface-device end and said second electrical-interface-device end, wherein an $n_i^{th}$ superconducting interface conductor is joined to a first end of an $n_i^{th}$ bundle conductor at said first electrical-interface-device end, and wherein said $n_j^{th}$ superconducting interface conductor is joined to an $(n_i+1)^{th}$ wire bundle conductor at said second electrical-interface-device end.

10. The apparatus of claim 9, wherein one of said N+1 superconducting interface conductors is connected to an external current source.

11. The apparatus of claim 9, wherein one of said N+1 superconducting interface conductors is configured to accept power input, and another of said N+1 superconducting interface conductors is configured to provide power output.

12. The apparatus of claim 1, wherein said electrical interface device comprises a first planar substrate disposed within said junction box, and a second planar substrate disposed within said junction box, said second planar substrate being parallel to said first planar substrate, said first planer substrate being spaced apart from said second planar substrate.

13. The apparatus of claim 1 wherein said junction box comprises N high-temperature-superconductor wire bundles, and said electrical interface device comprises a substrate for each of said N high-temperature-superconductor wire bundles.

14. The apparatus of claim 1, wherein said interface device comprises a plurality of substrates, each substrate includes a plurality of superconducting interface conductors.

15. The apparatus of claim 1, wherein said multi-turn winding is an N-turn winding, each turn of which is formed by a single bundle conductor, and wherein said N turns are formed by N serially joined bundle conductors.

16. The apparatus of claim 1, wherein each superconducting interface conductor is embedded in said substrate.

* * * * *